Figure 1:
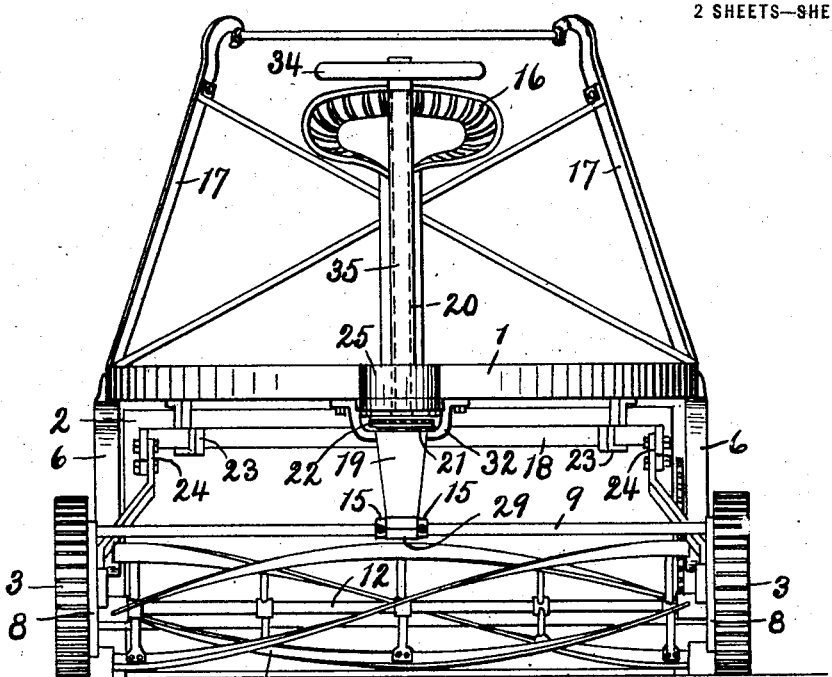

F. B. ARNOLD.
STEERING DEVICE FOR LAWN MOWERS.
APPLICATION FILED AUG. 10, 1918.

1,323,386.

Patented Dec. 2, 1919.
2 SHEETS—SHEET 2.

WITNESS:
A. C. Fairbanks

INVENTOR.
Frederick B. Arnold,
BY
Frank A. Cutter,
ATTORNEY.

UNITED STATES PATENT OFFICE.

FREDERICK B. ARNOLD, OF LONGMEADOW, MASSACHUSETTS.

STEERING DEVICE FOR LAWN-MOWERS.

1,323,386.   Specification of Letters Patent.   Patented Dec. 2, 1919.

Application filed August 10, 1918. Serial No. 249,245.

*To all whom it may concern:*

Be it known that I, FREDERICK B. ARNOLD, a citizen of the United States of America, and a resident of Longmeadow, in the county of Hampden and State of Massachusetts, have invented a new and useful Steering Device for Lawn-Mowers, of which the following is a specification.

My invention relates to improvements in power-driven, tractor lawn mowers, and resides more particularly in steering attachments or devices for such mowers, and said invention consists essentially of certain peculiar end and intermediate attaching and supporting means and steering means or mechanism whereby the cutting-mower is flexibly or movably instead of rigidly or immovably connected with the platform or frame of the machine, and the machine can be directed or steered thereby, all as hereinafter set forth.

Lawn mowers of the power-driven, tractor type are so constructed that it is necessary, in order to change the direction of the machine, to raise the cutting-mower at the front end of said machine from the ground, make the desired turn on the tractor roller, and lower said cutting-mower again, these operations being achieved with the aid of handles with which the machine is provided at the back end, and while the operator is on the ground behind the machine. The steering of a power-driven, tractor lawn mower is, therefore, a difficult, awkward, and troublesome operation, when the operator walks behind the machine as well as when he rides on the same.

The primary object of my invention is to provide means whereby the cutting-mower is movable independently of the rest of the machine, and is turned for steering purposes by means of an ordinary hand-wheel, to the end that the objections and disadvantages mentioned in the preceding paragraph are entirely eliminated, and the machine can be guided as easily and conveniently as an automobile. The operator does not leave his seat, on a machine which carries the operator, to steer the machine, but merely turns a steering-wheel near at hand, while the operator who walks behind his machine also steers by means of a steering-wheel conveniently located within his reach.

Another object is to provide means wherewith the rigidly-attached cutting-mower can be converted into a movable, steering device with little difficulty and expense, so that the power-driven, tractor, lawn mowers now in use can readily be altered to render them capable of being steered by ordinary hand-wheel-steering means and methods. My device can be substituted for the old connections between the frame and the cutting-mower of the machine, and the new attachments made, without mutilating or materially changing the elements connected by the old parts and members which are to be discarded and replaced by said device.

A further object is to produce a device of this kind which, while comparatively simple in construction, application, and operation, and comparatively inexpensive, is at the same time strong, durable, and withal highly practicable and efficient.

Other objects and advantages will appear in the course of the following description.

I attain the objects and secure the advantages of my invention by the means illustrated in the accompanying drawings, in which—

Figure 2:
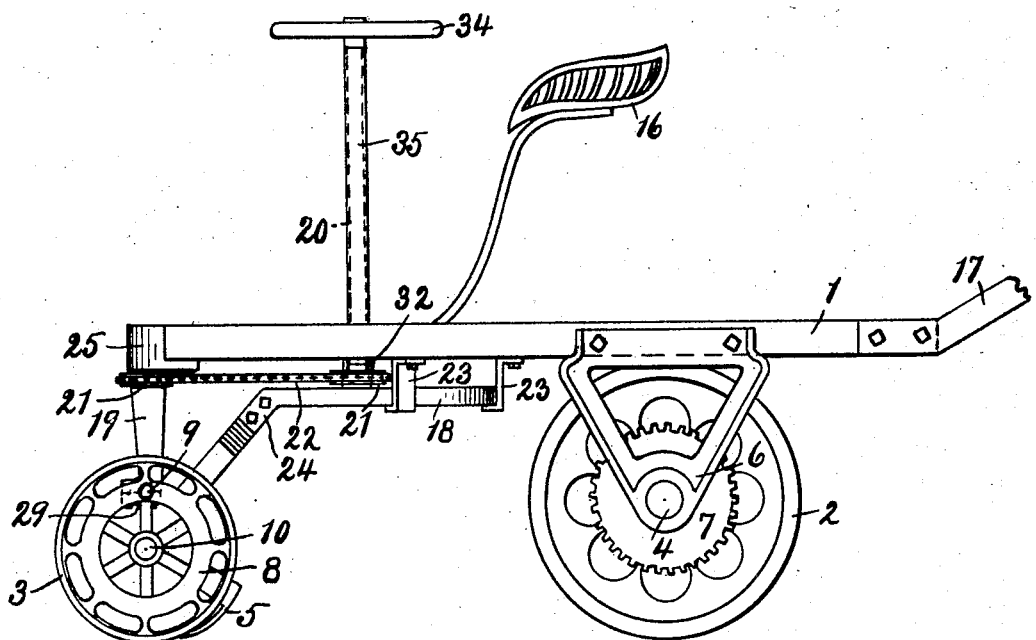
Figure 3:
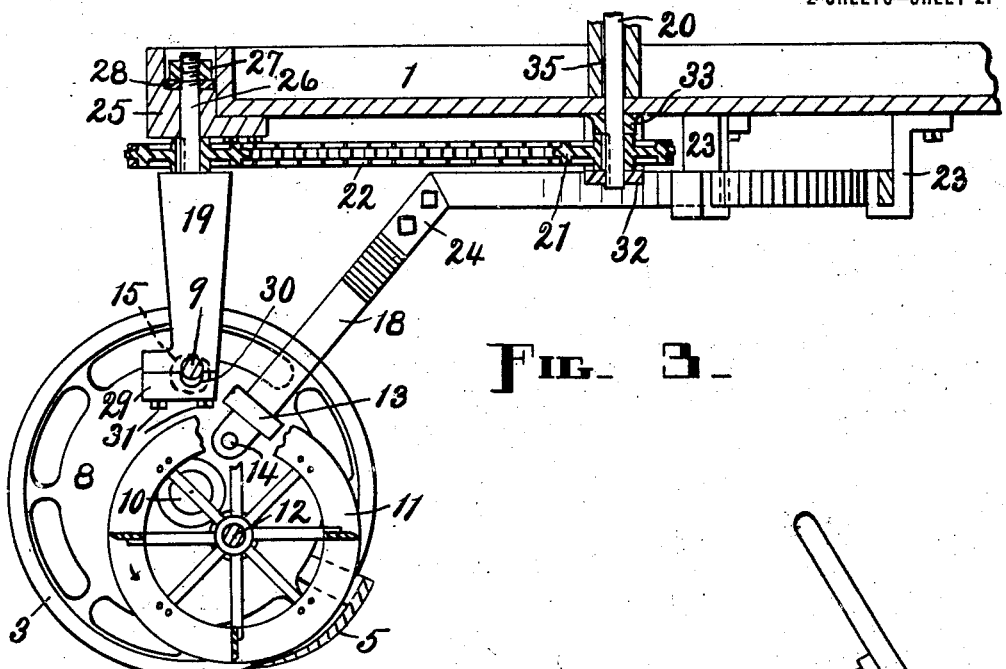
Figure 4:
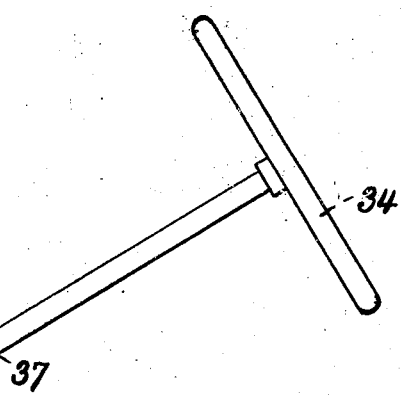

Figure 1 is a front elevation of a power-driven, tractor lawn mower which embodies or has embodied therein or therewith a practical form of my invention; Fig. 2, a side elevation of said lawn mower, the handles being broken off; Fig. 3, an enlarged, central, longitudinal, vertical section through the forward portion of said mower, or the portion that includes the new attachment or device, and, Fig. 4, an enlarged detail of parts of the steering mechanism used when the operator walks behind the machine.

Similar reference characters designate similar parts throughout the several views.

Although I have shown and will describe in detail a practical embodiment of my invention, it is to be understood that various changes in the shape, size, arrangement, and construction of some or all of the parts of said invention may be made without departing from the spirit thereof or exceeding the scope of what is hereinafter claimed, wherefore I do not desire or intend to be too closely restricted to the said embodiment.

A lawn mower, such as I have illustrated, is driven by power from a gasolene engine transmitted to the tractor roller of the machine, but since such engine, and the driving mechanism, gasolene tank, and other parts and members connected or associated with said engine, and which are to be found on the platform of the lawn mower, do not form parts of the present invention the same have been omitted from the drawings.

Before describing the attachment *per se*, I will briefly explain the old parts and members of the lawn mower, in connection with which said attachment is illustrated and with which said attachment is intimately connected.

A platform or frame 1 is mounted at or near the rear end on a traction roller 2 and at the front end on a pair of cutting-mower wheels 3. The roller 2 has a shaft 4 which is journaled in bearing brackets 6—6 depending from the sides of the frame 1. At 7 is represented a sprocket-wheel on the shaft 4, by means of which said shaft and the roller thereon are revolved, said sprocket-wheel being driven by the usual means and mechanism and in the usual manner. Besides the wheels 3, the cutting-mower comprises end pieces 8—8 connected by a guard or scraper plate 5 and a horizontal rod 9, said end pieces having trunnions 10—10 which extend outwardly therefrom and are received in the hubs of said wheels, and a revoluble cutter 11 consisting in part of a shaft 12 which is journaled in said end pieces, all of usual and well known construction and functioning in the same manner as do corresponding parts and members in other cutting-mowers.

Heretofore the cutting-mower has been rigidly attached to the frame 1 by means of fixed braces at the ends and an intermediate fixed bracket member, each of the former at its forward terminal passing through a lug 13 and engaging a pin 14, both of which are on the inside of one of the end pieces 8, as clearly shown in Fig. 3, and the latter being held between two collars 15 on the rod 9. These brace and bracket members I remove and substitute other members therefor, as will presently appear, but may still retain and use the lug 13 and pin 14 on each end piece 8, and the collars 15 on the rod 9.

Suitably supported on the frame 1 is a seat 16, and at the rear end of said frame is a pair of handles 17 such as is always provided. The seat 16 is omitted from a small machine which is not intended to be ridden by the operator and steered from a position on the frame 1.

Passing now to the new features and elements, it will be observed that they comprise means for attaching the cutting-mower to the frame 1 and supporting the latter at the front end on the former, and means with which to operate or actuate said cutting-mower for steering purposes. The attaching and supporting means comprises a brace 18 and a swivel bracket 19, and the steering mechanism comprises a steering-post 20, and means to actuate said bracket from said steering-post, such for example as sprocket-wheels 21—21 connected by a sprocket-chain 22.

The brace 18 consists of a horizontal, arcuate, rear portion supported beneath the frame 1, in brackets, hangers, or stirrups 23 which are fastened to the underside of said frame, and of forwardly and downwardly extending arms each of which is passed through the lug 13 and engaged with the pin 14 on one of the end pieces 8. Preferably the brace 18 is made in three pieces which are bolted together at 24, the joints at 24 being located just forward of the arcuate portion of said brace. The joints 24 afford means for easily and expeditiously disconnecting and connecting the cutting-mower from and with the frame 1, so far as the brace 18 is concerned. The amount of movement of the brace 18 in the stirrups 23 is comparatively small, in practice, because it is not feasible to give too great a turn to the cutting mower for steering purposes, owing to the fact that the machine is driven or propelled by the roller 2 and would come to a stop under an attempt to make too sharp a turn. However, the amount of movement in the stirrups 23 permitted to the brace is ample for the requirements in the case, and said brace is capable of being moved freely in said stirrups. The ends of the brace can be readily disconnected from and connected with the end pieces 8.

A bracket 25 is securely fastened to the frame 1 at the front end in the center, and the swivel bracket 19 has a spindle 26 which extends upwardly through said first-named bracket. One of the sprocket-wheels 21 is secured on the spindle 26 between the top of the bracket 19 and the bottom of the bracket 25. A nut 27 is threaded on to the upper terminal of the spindle 26, with a washer 28 between the bracket 25 and said nut, to hold said spindle and the bracket 19 in place without preventing them from turning on their axes, said nut and washer being countersunk in said bracket. The bracket 19 is provided on the bottom with a block 29 which is bolted thereto at 31. The contiguous surfaces of the bracket 19 and block 29 are grooved laterally to form an opening 30 for the rod 9. The bracket 19 is positioned with the groove in the bottom thereof directly over the center of the rod 9, and in connecting the cutting-mower such part of said rod the same being the part between the collars 15, is placed in said groove, then the block 29 is properly placed on said bottom with said part of said rod in the groove in said block, and the latter is secured to said bracket by the bolts 31. A swivel connection is thus formed between the frame 1 and the cutting-mower, and such connection and the connection afforded by the brace 18 are sufficient to attach said cutting-mower to said frame and support the forward end of said frame on said cutting-mower, besides making provision for the required amount of steering movement on the part of the cutting-mower.

The block 29 is removed when the brace 18 is disjointed at 24 for the purpose of disconnecting the cutting-mower. It is thus apparent that the disconnection of the cutting-mower is most conveniently effected, and that the connection of said cutting-mower is no less conveniently effected.

Since there is liable to be a slight amount of independent, tilting movement on the part of the cutting-mower during the mowing operation, I prefer to elongate the opening 30 vertically to accommodate the swivel support, that is, the bracket 19 with its block 29, to such movement. There is a sufficient amount of play, looseness, or freedom of the brace 18 in the stirrups 23 to absorb, as it were, whatever independent tilting action there may be of the cutting-mower.

The steering-post 20, which is vertical and in the present instance directly back of the spindle 26 in the longitudinal center of the frame 1, although such particular location of said post is far from imperative, extends downward through said frame and through a bearing bracket 32 which is secured to the underside of said frame. Secured on the steering-post 20 immediately above the horizontal part of the bracket 32 is the other sprocket-wheel 21, and a collar 33 is placed on said post between the frame 1 and said sprocket-wheel. The steering-post 20 may extend upwardly to a convenient height for one sitting on the seat 16, and have a hand-wheel 34 secured thereto at its upper end, as shown in Figs. 1, 2, and 3, or said post may extend only a short distance above the frame 1, as in Fig. 4. In the first case a casing 35 may be provided for the steering-post 20 between the frame 1 and the hand-wheel 34, but this is not essential.

The short steering-post 20 is used in a machine which the operator follows behind, instead of riding, and with such post and in order to accommodate the operator I provide intermeshing bevel-gears 36, and an auxiliary steering-post 37, which latter has a rearward incline and extends far enough to locate the hand-wheel 34, with which it is equipped at the rear end, within easy reach of said operator. One of the bevel-gears 36 is secured on the steering-post 20 at the upper end, a collar 38 being interposed between the frame 1 and said gear. The other bevel-gear 36 is secured on the auxiliary steering-post 37 at the forward end of the same. The auxiliary steering-post 37 is journaled in a bracket 39 which is secured to the top of the frame 1 behind the steering post 20. The steering-wheels 34 are alike in both cases.

It must now be plain that, when the steering-post 20 is given a partial turn in either direction, either by means of the hand-wheel mounted thereon or the hand-wheel mounted on the auxiliary steering-post 37 and through the medium of said auxiliary steering-post and the bevel-gears 36, the swivel bracket 19 is given a partial turn in the same direction, through the medium of the sprocket-wheels 21 and the sprocket-chain 22, and the cutting-mower is moved accordingly, since said bracket engages the rod 9 and the inner, rear portion of the brace 18 is free to slide in the stirrups 23. In this manner is the direction of the machine changed or the machine steered.

The device interferes in no way with the normal operation of the cutting mower, nor with that of the machine as a whole, except to enhance its usefulness.

The parts can be readily and conveniently assembled and disassembled, as will be clearly understood and as has been quite fully explained.

What I claim as my invention, and desire to secure by Letters Patent, is—

1. A steering device, for rotary-cutting lawn mowers, comprising, with the frame and cutting element of the machine, intermediate and end means for attaching said cutting element to said frame, such means being between said frame and said cutting element, and movable relative to the frame, and means to actuate the cutting element for steering purposes.

2. A steering device, for lawn mowers, comprising, with the frame and cutting-element of the machine, movable attaching and supporting means between said frame and the ends of said cutting-element, movable attaching and supporting means between said frame and cutting-element intermediate the ends of the latter, and actuating means for said second-named means, for steering purposes.

3. The combination, in a steering device for lawn mowers, with the frame and cutting element of the machine, supporting and guiding braces for the ends of said cutting element, said braces being supported from said frame to move in an arcuate course, and attached to said cutting-element, a swivel member between said frame and cutting-element and rigidly attached to the latter, and means applied to said swivel member to actuate the same for steering purposes.

4. The combination, in a steering device for lawn mowers, with the frame and cutting-element of the machine, of a brace supported from said frame to move in an arcuate course, and having its ends attached to said cutting-element, said brace being made in separable parts, a swivel member between said frame and cutting-element, and means to actuate said member for steering purposes.

5. The combination, in a steering device for lawn mowers, with the frame and cutting-element of the machine, said cutting-element including a rod, of a bracket having a spindle journaled at the front end of said frame, and attachable to said rod, a steering-post journaled in said frame, power-transmission members between said post and said spindle, and movable connecting and supporting means between said frame and the ends of said cutting-element.

6. The combination, in a steering device for lawn mowers, with the frame and cutting-element of the machine, said cutting-element including a rod, of a swivel bracket journaled at the front end of said frame, and provided with a removable block on the bottom, said rod being receivable between said bracket and block, means to impart rotative movement to said bracket, and movable connecting and supporting means between said frame and the ends of said cutting-element.

7. The combination, in a steering device for lawn mowers, with the frame and cutting-element of the machine, said cutting-element including a rod, of a swivel connection between said frame and said rod, said connection having an elongated opening therethrough to receive said rod, means to actuate said connection upon its axis, and movable connecting and supporting means between said frame and the ends of said cutting-element.

8. The combination, in a steering device for lawn mowers, with the frame and cutting-element of the machine, said cutting-element including a rod, and a front-end bracket and an underneath bracket secured to said frame, of a bracket attachable to said rod, and having a spindle which is journaled in said first-named bracket, a steering-post journaled in said frame and said second-named bracket, power-transmission connecting said spindle with said steering-post, and movable connecting and supporting means between said frame and the ends of said cutting-element.

9. The combination, in a steering device for lawn mowers, with the frame and cutting-element of the machine, and stirrups depending from the underside of said frame, of a brace having an arcuate part supported by and adapted to move in said stirrups, and having downwardly and forwardly extending end portions which are adapted to be attached to the ends of said cutting-element, an intermediate swivel connection between said frame and said cutting-element, and operating means for said connection, for steering purposes.

10. The combination, in a steering device for lawn mowers, with the frame and cutting-element of the machine, said cutting-element including a rod, and a front-end bracket, an underneath bracket, and stirrups secured to said frame, of a brace having an arcuate part supported by and adapted to move in said stirrups, and having downwardly and forwardly extending end portions which are adapted to be attached to the ends of said cutting-element, a bracket attachable to said rod and having a spindle which is journaled in said first-named bracket, a steering-post journaled in said frame and said second-named bracket, sprocket-wheels secured to said spindle and steering-post, and a sprocket-chain connecting said sprocket-wheels.

FREDERICK B. ARNOLD.

Witnesses:
F. A. CUTTER,
ARTHUR A. BETH.